United States Patent
Ichihara (10) Patent No.: US 10,104,094 B2
(45) Date of Patent: Oct. 16, 2018

(54) ON-VEHICLE COMMUNICATION SYSTEM

(71) Applicant: TOYOTA JIDOSHA KABUSHIKI KAISHA, Toyota-shi, Aichi-ken (JP)

(72) Inventor: Masaaki Ichihara, Gifu-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/830,758

(22) Filed: Dec. 4, 2017

(65) Prior Publication Data

US 2018/0091525 A1 Mar. 29, 2018

Related U.S. Application Data

(63) Continuation of application No. 14/918,896, filed on Oct. 21, 2015, now Pat. No. 9,866,570.

(30) Foreign Application Priority Data

Dec. 15, 2014 (JP) .................. 2014-253270

(51) Int. Cl.
*H04L 29/06* (2006.01)
*H04L 9/32* (2006.01)
(Continued)

(52) U.S. Cl.
CPC .......... *H04L 63/123* (2013.01); *H04L 9/3242* (2013.01); *H04L 67/12* (2013.01);
(Continued)

(58) Field of Classification Search
None
See application file for complete search history.

(56) References Cited

U.S. PATENT DOCUMENTS

| 9,331,854 B2 | 5/2016 | Oguma et al. |
| 2002/0082921 A1 | 6/2002 | Rankin |

(Continued)

FOREIGN PATENT DOCUMENTS

| JP | 2003-318894 A | 11/2003 |
| JP | 2013-048374 A | 3/2013 |

(Continued)

OTHER PUBLICATIONS

Min-Ho Park, Challenge-response based ACK message authentication, Aug. 2, 2012, Electronic Letters, vol. 48, No. 16. (Year: 2012).*

(Continued)

*Primary Examiner* — Michael R Vaughan
(74) *Attorney, Agent, or Firm* — Oliff PLC (57) ABSTRACT

An Electric Control Unit (ECU) device connected to an on-vehicle network and a network outside a vehicle. The ECU generating an ECU receiver code using an encryption key upon receipt of a message data frame, the encryption key being shared among ECUs communicable with the ECU, successfully authenticating the message data frame received the ECU, when the ECU receiver code matches a receiver code extracted from the message data frame received by the ECU, and when the message data frame received by the ECU is successfully authenticated, generate an ECU transmitter code using the encryption key, and transmit a message data frame that includes the generated ECU transmitter code to the on-vehicle network.

18 Claims, 4 Drawing Sheets

(51) Int. Cl.
  *H04W 12/10* (2009.01)
  *H04L 29/08* (2006.01)
  *H04W 12/12* (2009.01)
  *H04W 4/70* (2018.01)

(52) U.S. Cl.
  CPC ......... *H04W 12/10* (2013.01); *H04L 2209/84* (2013.01); *H04W 4/70* (2018.02); *H04W 12/12* (2013.01)

(56) References Cited

U.S. PATENT DOCUMENTS

| | | | |
|---|---|---|---|
| 2002/0099517 A1* | 7/2002 | Brendon | G01B 3/12 702/165 |
| 2003/0159041 A1 | 8/2003 | Yokota et al. | |
| 2006/0215581 A1 | 9/2006 | Castagnoli | |
| 2007/0104199 A1 | 5/2007 | Taha | |
| 2007/0245147 A1 | 10/2007 | Okeya | |
| 2008/0098218 A1 | 4/2008 | Sibigtroth et al. | |
| 2010/0111308 A1 | 5/2010 | Forsberg et al. | |
| 2010/0177737 A1 | 7/2010 | Song et al. | |
| 2010/0208886 A1 | 8/2010 | Boehl et al. | |
| 2011/0047630 A1 | 2/2011 | Cheng et al. | |
| 2011/0066309 A1 | 3/2011 | Matsuoka et al. | |
| 2011/0205043 A1* | 8/2011 | Fujiki | G01D 7/00 340/439 |
| 2012/0093312 A1 | 4/2012 | Gammel et al. | |
| 2012/0313796 A1 | 12/2012 | Lee et al. | |
| 2014/0114497 A1 | 4/2014 | Miyake | |
| 2014/0310530 A1 | 10/2014 | Oguma et al. | |
| 2014/0359292 A1 | 12/2014 | Kawamura et al. | |
| 2016/0035147 A1 | 2/2016 | Huang | |
| 2016/0173530 A1 | 6/2016 | Miyake | |
| 2016/0371481 A1* | 12/2016 | Miyake | G06F 21/445 |
| 2017/0324558 A1* | 11/2017 | Takemori | H04L 9/3226 |

FOREIGN PATENT DOCUMENTS

| | | |
|---|---|---|
| JP | 2013-098719 A | 5/2013 |
| JP | 2013-142963 A | 7/2013 |
| JP | 2013-192091 A | 9/2013 |
| JP | 2013192091 A * | 9/2013 |

OTHER PUBLICATIONS

Feb. 27, 2017 Office Action issued in U.S Appl. No. 14/918,896.
Sep. 12, 2017 Notice of Allowance issued in U.S. Appl. No. 14/918,896.

* cited by examiner

| MESSAGE NAME | IDENTIFIER (ID) | ENCRYPTION KEY |
|---|---|---|
| COMMUNICATION INFORMATION A | 100 | K1 |
| COMMUNICATION INFORMATION B | 150 | K2 |

FIG. 5

ON-VEHICLE COMMUNICATION SYSTEM

PRIORITY INFORMATION

This is a Continuation of U.S. application Ser. No. 14/918,896 filed Oct. 21, 2015, which claims priority to JP 2014-253270 filed Dec. 15, 2014. The disclosures of the prior applications are hereby incorporated by reference herein in their entirety.

BACKGROUND OF THE INVENTION

Field of the Invention

The present invention relates to an on-vehicle communication system that performs message authentication.

Description of the Background Art

To date, an on-vehicle communication system that uses encryption key to perform message authentication has been known. This type of on-vehicle communication system is described in Japanese Laid-Open Patent Publication No. 2013-098719 (hereinafter, referred to as Patent Literature 1). In the on-vehicle communication system described in Patent Literature 1, after a main message including data to be communicated has been transmitted, an MAC message including an MAC (message authentication code) for a data filed of the main message is transmitted. The MAC is obtained by an AES encryption algorithm that is one of common key block encryption methods. The validity of the main message is verified on a receiver side by determining whether or not the MAC obtained from the data filed of the received main message matches the MAC included in the received MAC message.

Further, an on-vehicle communication system that is connected to a network outside the vehicle, has been known. As this type of on-vehicle communication system, a system that performs wireless communication with an external device via a data communication module (DCM) is put into practical use.

SUMMARY OF THE INVENTION

An on-vehicle communication system connected to a network outside a vehicle may be subject to cyber-attack such as unauthorized intrusion or virus (malicious program) infection. For example, a third party may access an on-vehicle network via an ECU (an ECU having an interface to a network outside a vehicle) connected to a network outside a vehicle, to, illicitly intercept communication data communicated between the ECUs, falsify the communication data to generate fraudulent data, and transmit the fraudulent data to the on-vehicle network.

However, a conventional on-vehicle communication system that performs message authentication uses one kind of encryption key to perform message authentication. In a case where an ECU connected to a network outside a vehicle is provided in a conventional on-vehicle communication system, the ECU may have the same encryption key as another ECU that is not connected to the network outside the vehicle. To the fraudulent data transmitted to the on-vehicle network from the ECU connected to the network outside the vehicle, a message authentication code that is generated by use of the same encryption key as used for the other ECU, is assigned. If the ECU which is not connected to the network outside the vehicle receives the fraudulent data, authentication of the fraudulent data would succeed. Even in, for example, an ECU into which a third party cannot directly intrude, a process operation of the ECU may be affected by cyber-attack.

An object of the present invention is to provide an on-vehicle communication system, having an ECU connected to a network outside a vehicle, which can prevent a process operation of an ECU which is not connected to the network outside the vehicle from being affected by cyber-attack.

A first invention is directed to an on-vehicle communication system that performs message authentication by use of: a transmitter code that is a message authentication code generated by a transmitter of communication data; and a receiver code that is a message authentication code generated by a receiver of the communication data. The on-vehicle communication system includes: a first ECU connected to an on-vehicle network, the first ECU having only a first encryption key among the first encryption key and a second encryption key different from the first encryption key; a second ECU connected to the on-vehicle network and having at least the first encryption key; and a third ECU connected to the on-vehicle network and a network outside a vehicle, the third ECU having only the second encryption key among the first encryption key and the second encryption key, the third ECU configured to generate the transmitter code or the receiver code by use of the second encryption key when making communication over the on-vehicle network. The second ECU transmits communication data to which the transmitter code generated by use of the first encryption key is assigned. The first ECU verifies, when receiving the communication data, the transmitter code assigned to the received communication data by using the receiver code generated by use of the first encryption key.

According to the first invention, the first ECU has only the first encryption key among the first encryption key and the second encryption key. The second ECU has at least the first encryption key. The third ECU connected to the network outside the vehicle has only the second encryption key among the first encryption key and the second encryption key. The second ECU transmits communication data to which the transmitter code generated by use of the first encryption key is assigned. The first ECU verifies, when receiving the communication data from the second ECU, the transmitter code assigned to the received communication data by using the receiver code generated by use of the first encryption key. In this case, since both the transmitter code and the receiver code are generated by use of the first encryption key, authentication of the communication data succeeds.

Further, even if fraudulent data is transmitted from the third ECU to the on-vehicle network, the third ECU does not have the first encryption key, and generates the transmitter code by use of the second encryption key. The first ECU verifies, when receiving the fraudulent data, the transmitter code assigned to the fraudulent data by using the receiver code generated by use of the first encryption key. In this case, since the transmitter code and the receiver code are generated by use of the encryption keys different from each other, authentication of the fraudulent data does not succeed.

In a second invention based on the first invention, a fourth ECU connected to the on-vehicle network, the fourth ECU having the first encryption key and the second encryption key, is further provided. The second ECU assigns the transmitter code generated by use of the first encryption key, to communication data having a first identifier assigned thereto, and transmits the communication data. The third ECU assigns the transmitter code generated by use of the second encryption key, to communication data to which a second identifier different from the first identifier is assigned, and transmits the communication data. The fourth ECU verifies, when the first identifier is assigned to the communication data having been received, the transmitter code assigned to the received communication data by using the receiver code generated by use of the first encryption key, and verifies, when the second identifier is assigned to the communication data having been received, the transmitter code assigned to the received communication data by using the receiver code generated by use of the second encryption key.

According to the second invention, the fourth ECU has the first encryption key such that the fourth ECU can perform authentication of normal communication data from the second ECU, and has the second encryption key such that the fourth ECU can perform authentication of normal communication data from the third ECU. The second ECU assigns the transmitter code generated by use of the first encryption key, to communication data to which the first identifier is assigned, and transmits the communication data. The third ECU assigns the transmitter code generated by use of the second encryption key, to communication data to which the second identifier is assigned, and transmits the communication data.

When the fourth ECU receives the communication data from the second ECU, the communication data has the first identifier assigned thereto. The fourth ECU uses the receiver code generated by use of the first encryption key for verifying the transmitter code assigned to the received communication data. In this case, since both the transmitter code and the receiver code are generated by use of the first encryption key, authentication of the communication data succeeds. Further, when the fourth ECU receives the communication data from the third ECU, since both the transmitter code and the receiver code are generated by use of the second encryption key, authentication of the communication data succeeds. In the second invention, since the fourth ECU selectively uses the encryption key based on the identifier assigned to the communication data, the transmitter code can be verified for each of the communication data from the second ECU and the communication data from the third ECU.

In a third invention based on the first invention, a fourth ECU connected to the on-vehicle network and having the second encryption key, and a fifth ECU configured to transmit a most recent accumulated travel distance of the vehicle to each of the third ECU and the fourth ECU, are further provided. The fourth ECU transmits communication data to which the transmitter code generated by use of: the most recent accumulated travel distance received from the fifth ECU; and the second encryption key, is assigned. The third ECU verifies, when receiving the communication data from the fourth ECU, the transmitter code assigned to the received communication data by using the receiver code generated by use of: the most recent accumulated travel distance received from the fifth ECU; and the second encryption key.

According to the third invention, the message authentication code is generated by use of an accumulated travel distance having a value varying according to traveling of the vehicle, in addition to the encryption key, by each of the fourth ECU and the third ECU, for the communication data transmitted from the fourth ECU to the third ECU. When the accumulated travel distance is increased, the newly generated message authentication code is not the same as the previously generated message authentication code.

In a fourth invention based on the first invention, a fourth ECU connected to the on-vehicle network and having the second encryption key, is further provided. The fourth ECU sends an access request to the third ECU to receive, as challenge data, a random number generated by the third ECU, and thereafter transmits communication data to which the transmitter code generated by use of the challenge data and the second encryption key is assigned. The third ECU verifies, when receiving the communication data from the fourth ECU, the transmitter code assigned to the received communication data by using the receiver code generated by use of: the same data as the challenge data transmitted to the fourth ECU, and the second encryption key.

According to the fourth invention, the message authentication code is generated by use of the challenge data in addition to the encryption key, by each of the third ECU and the fourth ECU, for the communication data transmitted from the fourth ECU to the third ECU. The challenge data is a random number generated by a node that receives an access request in the authentication in a challenge and response method. In the fourth invention, the message authentication code for communication data transmitted from the fourth ECU to the third ECU is generated by use of the random number.

In a fifth invention based on the first invention, a fourth ECU connected to the on-vehicle network, the fourth ECU having the first encryption key and the second encryption key, is further provided. The fourth ECU transmits communication data to which a first transmitter code generated by use of the first encryption key, and a second transmitter code generated by use of the second encryption key, are assigned. Each of the first ECU and the third ECU determines, when receiving the communication data from the fourth ECU, that authentication of the communication data has succeeded in a case where the receiver code generated by use of the encryption key stored in a corresponding one of the first ECU and the third ECU matches one of the first transmitter code and the second transmitter code assigned to the received communication data.

According to the fifth invention, when the fourth ECU transmits communication data to be used by each of the first ECU and the third ECU, the fourth ECU assigns, to the communication data, the first transmitter code generated by use of the first encryption key and the second transmitter code generated by use of the second encryption key. In the first ECU that has received the communication data from the fourth ECU, the receiver code generated by use of the first encryption key stored in the first ECU matches the first transmitter code among the first transmitter code and the second transmitter code assigned to the received communication data. In the third ECU that has received the communication data from the fourth ECU, the receiver code generated by use of the second encryption key stored in the third ECU matches the second transmitter code among the first transmitter code and the second transmitter code assigned to the received communication data. Each of the first ECU and the third ECU determines that authentication of the communication data has succeeded. In the fifth invention, the transmitter code assigned to communication data can be verified by both the first ECU having only the first encryption key and the third ECU having only the second encryption key.

In a sixth invention based on the first invention, the first ECU is an ECU configured to control a vehicle running state.

According to the first invention, the first encryption key used by the first ECU for verifying the transmitter code is not stored in the third ECU. Therefore, even if fraudulent data is transmitted to the on-vehicle network from the third ECU connected to the network outside the vehicle, authentication of the fraudulent data does not succeed in the first ECU. Therefore, a process operation of the first ECU that is not connected to the network outside the vehicle can be prevented from being affected by cyber-attack.

According to the second invention, since the fourth ECU selectively uses the encryption key based on the identifier assigned to the communication data, the transmitter code can be verified for each of the communication data from the second ECU and the communication data from the third ECU. Therefore, after the transmitter code is verified for each of the communication data from the second ECU and the communication data from the third ECU, the fourth ECU is allowed to use the communication data.

According to the third invention, an accumulated travel distance is used for generating the message authentication code for communication data transmitted from the fourth ECU to the third ECU. In the on-vehicle communication system connectable to the network outside the vehicle, transmission of copy data including copies of the communication data and the transmitter code, to the on-vehicle network, is assumed as cyber-attack. If the copy data including copies of the communication data and the transmitter code transmitted from the fourth ECU to the third ECU is transmitted to the on-vehicle network, authentication of the copy data would succeed in the third ECU when only the second encryption key is used for generating the message authentication code. The communication data included in the copy data may be transmitted to an external device. In a case where the copy data is transmitted to the on-vehicle network after elapse of some time since normal communication data has been transmitted, communication data different from the most recent information may be transmitted to the external device. In the third invention, since the accumulated travel distance is used for generating the message authentication code, when the accumulated travel distance is increased, the newly generated message authentication code is not the same as the previously generated message authentication code. Therefore, authentication of the copy data can be prevented from succeeding in the third ECU, and transmission of communication data different from the most recent information to the external device can be prevented.

According to the fourth invention, since the challenge data is used for generating the message authentication code for the communication data transmitted from the fourth ECU to the third ECU, the code is different each time the message authentication code is generated. Therefore, authentication of the copy data as described above can be prevented from succeeding in the third ECU, and transmission of communication data different from the most recent information to the external device can be prevented.

According to the fifth invention, both the first ECU having only the first encryption key and the third ECU having only the second encryption key can verity the transmitter code assigned to the communication data. The communication data to be used by two ECUs, that is, the first ECU and the third ECU, can be transmitted at one time.

According to the sixth invention, a process operation of the ECU for controlling a vehicle running state can be prevented from being affected by cyber-attack.

DESCRIPTION OF THE PREFERRED EMBODIMENTS

Figure 1:
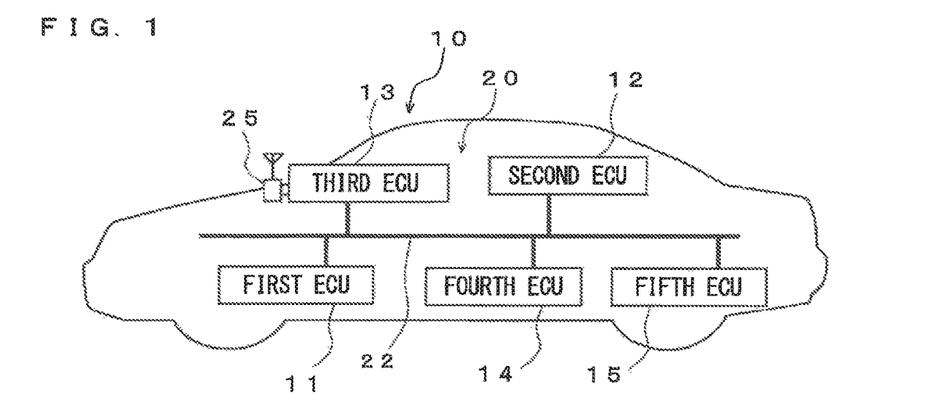
FIG. 1 is a schematic block diagram illustrating an on-vehicle communication system according to an embodiment.

Hereinafter, an embodiment will be described in detail with reference to FIG. 1 to FIG. 5. FIG. 1 is a schematic block diagram illustrating an on-vehicle communication system 10 according to the present embodiment. The on-vehicle communication system 10 includes an ECU connected to a network outside the vehicle. In the present embodiment, an encryption key stored in an ECU which is not connected to the network outside the vehicle, and an encryption key stored in the ECU connected to the network outside the vehicle are made different from each other. Therefore, even if fraudulent data is transmitted to an on-vehicle network 20 from the ECU connected to the network outside the vehicle, authentication of the fraudulent data does not succeed in the ECU which is not connected to the network outside the vehicle.

[Entire Configuration of On-Vehicle Communication System]

As shown in FIG. 1, the on-vehicle communication system 10 is a communication system that includes: a transmission path 22 (bus); and a plurality of ECUs (Electronic Control Units) 11 to 15 (nodes) connected to each other via the transmission path 22. The plurality of ECUs 11 to 15 are connected to each other via the transmission path 22, thereby forming the on-vehicle network 20. Hereinafter, the ECU 11 is referred to as a first ECU 11, the ECU 12 is referred to as a second ECU 12, the ECU 13 is referred to as a third ECU 13, the ECU 14 is referred to as a fourth ECU 14, and the ECU 15 is referred to as a fifth ECU 15.

Each of the ECUs 11 to 15 controls a corresponding on-vehicle device. The first ECU 11, the second ECU 12, the fourth ECU 14, and the fifth ECU 15 each have an interface, for inside of the vehicle, to the on-vehicle network 20, but does not have an interface, for outside of the vehicle, to the network outside the vehicle. The third ECU 13 has an interface, for inside of the vehicle, to the on-vehicle network 20, and an interface, for outside of the vehicle, to the network outside the vehicle. The interface, for inside of the vehicle, of each of the ECUs 11 to 15 is connected to the transmission path 22. A communication unit 25 is connected to the interface for outside of the vehicle, and the communication unit 25 is controlled by the third ECU 13. Each of the ECUs 11 to 15 is connected to the on-vehicle network 20, and communicates with another of the ECU 11 to 15 via the on-vehicle network 20. The third ECU 13 is connected to the network outside the vehicle, and communicates (for example, makes secure communication) with an external device (for example, external terminal outside the vehicle) via the network outside the vehicle. The third ECU 13 and the communication unit 25 form a communication unit, for outside of the vehicle, which communicates with an external device. The external device is, for example, an ITS terminal (ITS spot) or a multimedia external terminal. Each of the ECUs 11 to 15 is implemented as a microcomputer including a CPU, a ROM, a RAM, and the like (not shown). Each of the ECUs 11 to 15 executes various processes by the CPU executing a program stored in a memory such as the ROM.

In the on-vehicle communication system 10, a data frame is used for communication between the ECUs 11 to 15. In the on-vehicle network 20, the data frame is transmitted and received between the ECUs 11 to 15 according to a predetermined communication protocol. The on-vehicle network 20 is, for example, a CAN (Controller Area Network). The on-vehicle communication system 10 includes, in addition to the on-vehicle network 20, an on-vehicle network (for example, LIN (Local Interconnect Network)) other than the CAN, and a gateway that connects between on-vehicle networks having communication protocols different from each other (not shown). The third ECU 13 having the interface for outside of the vehicle may be provided in an on-vehicle network other than the CAN.

The data frame includes at least a data area and an identifier area. In the data area, communication information is stored. In the identifier area, an identifier associated with the communication information stored in the data area, is stored. The data frame includes at least the communication information and the identifier. The communication information is, for example, vehicle speed information (speed of a subject vehicle), engine information, and camera information. To different kinds of communication information, different identifiers are assigned. For example, the identifier is represented as a numerical value assigned for each communication information. In the CAN, a CANID is used as the identifier.

In the on-vehicle communication system 10, message addressing using the identifier is used. Each of the ECUs 11 to 15 transmits, to the on-vehicle network 20, a data frame in which the communication information is stored in the data area, and an identifier associated with the communication information is stored in the identifier area. The ECUs 11 to 15 are allowed to receive the data frame that flows through the on-vehicle network 20 connected to the ECUs 11 to 15. When each of the ECUs 11 to 15 receives the data frame, each of the ECUs 11 to 15 determines whether or not the communication information to be used by the ECU for controlling the corresponding on-vehicle device, is included in the data frame, based on the identifier included in the data frame. While each of the ECUs 11 to 15 is allowed to receive the data frame that flows through the on-vehicle network 20 regardless of the identifier included in the data frame, each of the ECUs 11 to 15 selects the data frame to be used by the ECU for controlling the corresponding on-vehicle device, from among the received data frames, based on the identifier.

Further, in the on-vehicle communication system 10, message authentication is performed as authentication procedure for verifying the validity of the data frame. The on-vehicle communication system 10 may be subject to cyber-attack via the interface for outside of the vehicle. In the on-vehicle communication system 10, message authentication is performed in order to improve security for the on-vehicle network 20. In the on-vehicle communication system 10, a first encryption key K1 and a second encryption key K2 different from the first encryption key K1 are prepared as encryption keys used for the message authentication. The first encryption key K1 is used for communication between the ECUs having no interface for outside of the vehicle. The second encryption key K2 is used for communication between the ECU having no interface for outside of the vehicle, and the ECU having the interface for outside of the vehicle. Each of the first ECU 11 and the second ECU 12 has only the first encryption key K1 among the first encryption key K1 and the second encryption key K2. The third ECU 13 has only the second encryption key K2 among the first encryption key K1 and the second encryption key K2. The fourth ECU 14 has the first encryption key K1 and the second encryption key K2. In each of the ECUs 11 to 14, the encryption key is stored in the memory. The encryption key stored in the fifth ECU 15, or the like will be described below in modification.

[Message Authentication]

For message authentication, a transmission-side process is performed by a transmission-side ECU, among the ECUs 11 to 15, which transmits the data frame, and a reception-side process is thereafter performed by a reception-side ECU, among the ECUs 11 to 15, which receives the data frame. The transmission-side process is a process for assigning a message authentication code (MAC) to the data frame to be transmitted. The reception-side process is a process for verifying the message authentication code assigned to the received data frame. In the following description, the message authentication code generated by a transmitter of the data frame is referred to as "transmitter code", and the message authentication code generated by a receiver of the data frame is referred to as "receiver code". For generating the message authentication code by use of the encryption key, a MAC algorithm (for example, a mode using a hash function, a mode using a block encryption algorithm) is used.

Figure 2:
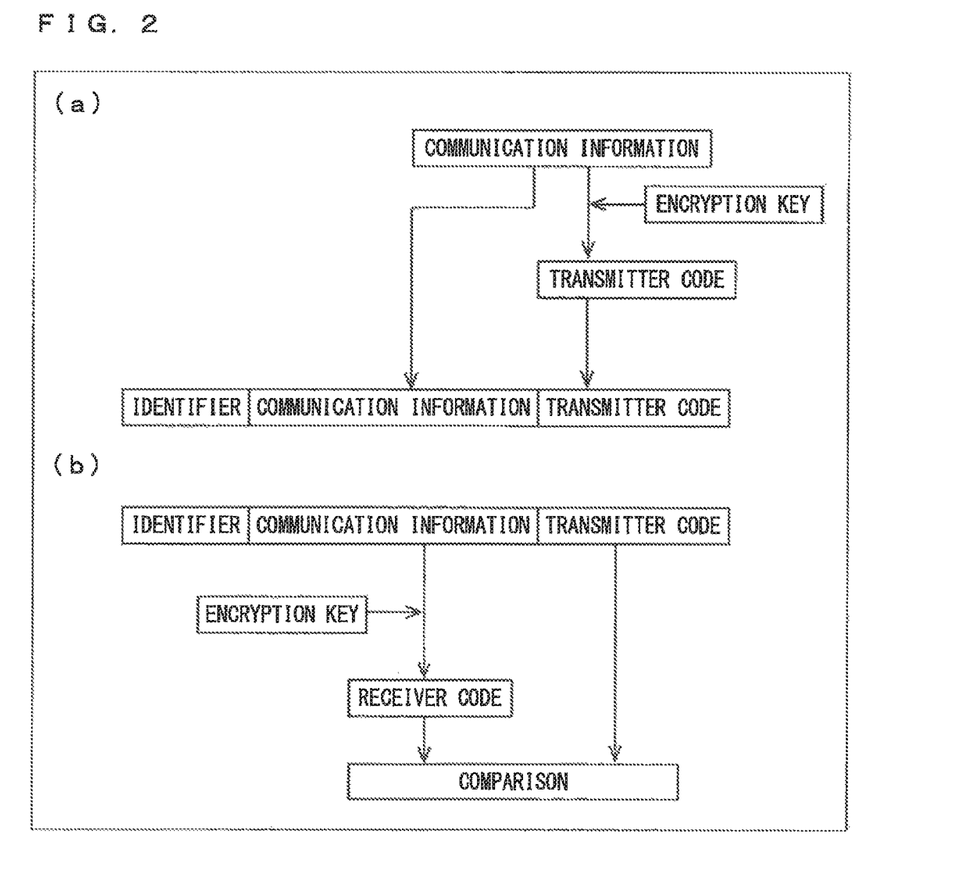
FIG. 2 illustrates a method for generating a message authentication code.

FIG. 2 illustrates a method for generating a message authentication code. The transmission-side process will be described. Each of the ECUs 11 to 15 uses the communication information stored in the data area of the data frame, as a message for generating the transmitter code, as shown in FIG. 2 (*a*). Each of the ECUs 11 to 15 uses a predetermined encryption key to generate a transmitter code from the communication information. Each of the ECUs 11 to 15 assigns the transmitter code to the communication information (message), and transmits, to the on-vehicle network 20, the data frame including the identifier, the communication information, and the transmitter code.

Subsequently, the reception-side process will be described. In a case where each of the ECUs 11 to 15 determines, when receiving the data frame that flows through the on-vehicle network 20, that the communication information to be used by the ECU is included in the data frame, based on the identifier included in the data frame, the ECU executes the reception-side process. As shown in FIG. 2 (*b*), each of the ECUs 11 to 15 uses the communication information stored in the data area of the received data frame, as a message for generating a receiver code. Each of the ECUs 11 to 15 uses a predetermined encryption key to generate a receiver code from the communication information extracted from the data area. Each of the ECUs 11 to 15 compares the transmitter code assigned to the received data frame, with the receiver code generated by the ECU itself. When the transmitter code and the receiver code match each other, each of the ECUs 11 to 15 determines that "the authentication has succeeded". When the transmitter code and the receiver code do not match each other, each of the ECUs 11 to 15 determines that "the authentication has failed".

In the present embodiment, the transmitter code assigned to the communication information (communication data) is stored in the same data frame as for the communication information, and transmitted to the on-vehicle network 20. In this case, the transmitter code may be stored in the identifier extended area of the extended format as described in Japanese Laid-Open Patent Publication No. 2013-48374. Alternatively, the transmitter code assigned to the communication information may be included in an MAC message as described in Patent Literature 1, and the transmitter code included in the MAC message may be transmitted to the on-vehicle network 20 separately from the communication information.

The first ECU 11 is an ECU (ECU for safe running of a vehicle) for controlling a vehicle running state. The first ECU 11 controls the on-vehicle device by use of communication information A (for example, vehicle speed information) transmitted from the second ECU 12. A first identifier is assigned to the communication information A.

The second ECU 12 is, for example, an ECU for controlling a vehicle running state. The second ECU 12 is an ECU that serves as a transmitter of the communication information A (the communication information used by the first ECU 11) in the on-vehicle network 20. The transmitter of the communication information in the on-vehicle network 20 represents an ECU that has firstly transmitted the communication information to the on-vehicle network 20. The second ECU 12 performs the transmission-side process when transmitting the data frame including the communication information A. The second ECU 12 generates a transmitter code from the communication information A by use of the first encryption key K1, and transmits the data frame including the first identifier assigned to the communication information A, the communication information A, and the transmitter code.

Figure 3:
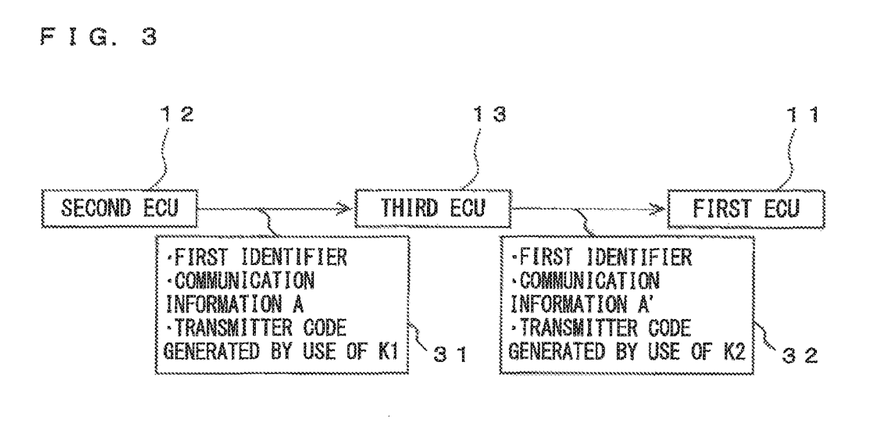
FIG. 3 illustrates a case where a data frame including fraudulent data is transmitted from a third ECU.

Next, a case where, for example, a data frame 31 transmitted from the second ECU 12 is illicitly intercepted by a third party that accesses the on-vehicle network 20 via the third ECU 13 connected to the network outside the vehicle, will be described with reference to FIG. 3. The data frame 31 includes the first identifier, the communication information A, and the transmitter code generated by use of the first encryption key K1. The third part falsifies the communication information A included in the data frame 31 to generate communication information A', and transmits a data frame 32 including the communication information A' (fraudulent data), from the third ECU 13 to the on-vehicle network 20. The third ECU 13 performs the transmission-side process when transmitting the data frame 32. The third ECU 13 does not have the first encryption key K1. Therefore, the third ECU 13 generates the transmitter code from the communication information A' by use of the second encryption key K2, and the third ECU 13 transmits the data frame including the first identifier, the communication information A', and the transmitter code. Since the data frame includes the first identifier, the first ECU 11 that has received the data frame 32 determines that the communication information to be used by the first ECU 11 for controlling the on-vehicle device is included in the data frame, and then performs the reception-side process. The first ECU 11 uses the first encryption key K1 to generate the receiver code from the communication information A'. In this case, since the second encryption key K2 is used for generating the transmitter code and the first encryption key K1 is used for generating the receiver code, the authentication of the data frame 32 does not succeed. Therefore, the process operation of the first ECU 11 can be prevented from being affected by cyber-attack.

Further, the fourth ECU 14 is an ECU for controlling the on-vehicle device by use of the communication information A transmitted from the second ECU 12, and communication information B transmitted from the third ECU 13. The communication information B is information obtained by the third ECU 13 from an external device via the interface for outside of the vehicle. A second identifier is assigned to the communication information B.

As described above, the second ECU 12 performs the transmission-side process when transmitting the data frame including the communication information A. The second ECU 12 generates the transmitter code from the communication information A by use of the first encryption key K1, and transmits the data frame including the first identifier, the communication information A, and the transmitter code. The third ECU 13 performs the transmission-side process when transmitting the data frame including the communication information B. The third ECU 13 generates the transmitter code from the communication information B by use of the second encryption key K2, and transmits the data frame including the second identifier, the communication information B, and the transmitter code.

Figure 4:
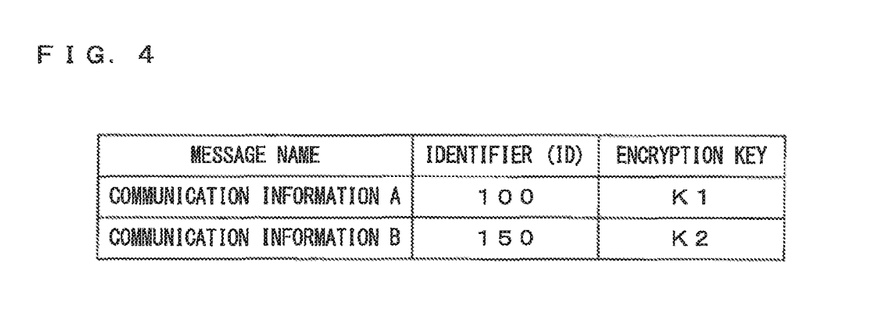
FIG. 4 illustrates a reception table.
Figure 5:
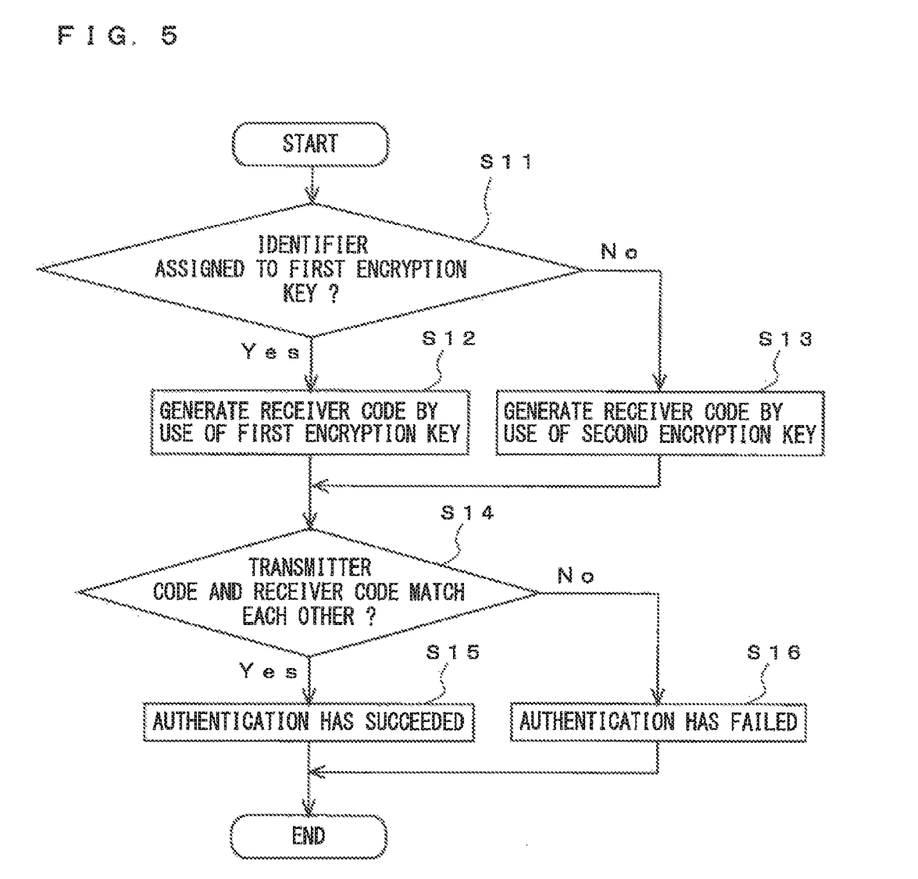
FIG. 5 is a flow chart showing a reception-side process performed by a fourth ECU.

FIG. 4 illustrates an example of a reception table used by the fourth ECU 14 for the reception-side process or the like. FIG. 5 is a flow chart showing the reception-side process performed by the fourth ECU 14. In the reception table, identifiers are associated with the communication information used by the fourth ECU 14 for controlling the on-vehicle device. In a case where the data frame is received, when the identifier included in the received data frame is among the identifiers in the reception table, the fourth ECU 14 determines that the communication information to be used by the fourth ECU 14 is included in the data frame, and then performs the reception-side process. In a case where the fourth ECU 14 receives the data frame including the communication information A or the data frame including the communication information B, the identifier (the first identifier or the second identifier) included in the received data frame is among the identifiers in the reception table, and the fourth ECU 14 performs the reception-side process.

In the reception table, as shown in FIG. 4, the encryption key is assigned to each identifier. The first encryption key K1 is assigned to the first identifier (ID=100) associated with the communication information A. The second encryption key K2 is assigned to the second identifier (ID=150) associated with the communication information B. In the reception table, the first encryption key K1 is assigned to the first identifier provided by the ECU (the second ECU 12) having no interface for outside of the vehicle, and the second encryption key K2 is assigned to the second identifier provided by the third ECU 13. Whether or not the identifier included in the data frame is provided by the ECU having no interface for outside of the vehicle (that is, whether or not the identifier is provided by the ECU other than the third ECU 13 which may become a transmitter of fraudulent data) can be determined with reference to the reception table.

In FIG. 4, only two kinds of communication information are indicated. However, the number of kinds of the communication information used by the fourth ECU 14 for controlling the on-vehicle device may be three or more. In this case, the first encryption key K1 is assigned to the identifier provided by the ECU having no interface for outside of the vehicle, and the second encryption key K2 is assigned to the identifier provided by the third ECU 13.

The reception-side process performed by the fourth ECU 14 will be specifically described with reference to FIG. 5. The fourth ECU 14 sets the received data frame as a frame to be verified, and verifies the transmitter code assigned to the frame to be verified, to perform the reception-side process.

The fourth ECU 14 performs determination of a key-to-be-used in which an encryption key to be used for generating the receiver code is determined, in step S11. The fourth ECU 14 performs, as the determination of a key-to-be-used, determination as to whether or not the identifier included in the frame to be verified is an identifier assigned to the first encryption key K1 in the reception table, with reference to the reception table. When the identifier included in the frame to be verified is an identifier assigned to the first encryption key K1, the fourth ECU 14 advances the process to step S12, and generates the receiver code by use of the first encryption key K1. On the other hand, when the identifier included in the frame to be verified is not an identifier assigned to the first encryption key K1 (the identifier included in the frame to be verified is an identifier assigned to the second encryption key K2), the fourth ECU 14 advances the process to step S13, and generates the receiver code by use of the second encryption key K2. Thus, the fourth ECU 14 selectively uses the first encryption key K1 or the second encryption key K2 according to the identifier included in the frame to be verified. When step S12 or step S13 ends, the process is advanced to step S14.

In step S14, the fourth ECU 14 determines whether or not the transmitter code and the receiver code match each other. In a case where the transmitter code and the receiver code match each other, the fourth ECU 14 determines that "authentication has succeeded" in step S15. In this case, the fourth ECU 14 uses the communication information included in the frame to be verified to control the on-vehicle device. On the other hand, when the transmitter code and the receiver code do not match each other, the fourth ECU 14 determines that "authentication has failed" in step S16. In this case, the fourth ECU 14 does not use the communication information included in the frame to be verified for controlling the on-vehicle device.

A case where the fourth ECU 14 receives, from the second ECU 12, a normal data frame including the communication information A, will be described. In the data frame, the first identifier is included as described above. Therefore, the fourth ECU 14 determines "Yes" in step S11, and the fourth ECU 14 uses the first encryption key K1 to generate the receiver code in step S12. The transmitter code generated by use of the first encryption key K1 is assigned to the normal data frame from the second ECU 12. Therefore, in step S14, the transmitter code and the receiver code match each other, and it is determined in step S15 that "authentication has succeeded". The fourth ECU 14 uses the communication information A to control the on-vehicle device.

Next, a case where the fourth ECU 14 receives, from the third ECU 13, a normal data frame including the communication information B, will be described. In the data frame, the second identifier is included as described above. Therefore, the fourth ECU 14 determines "No" in step S1, and generates the receiver code by use of the second encryption key K2 in step S13. The transmitter code generated by use of the second encryption key K2 is assigned to the normal data frame from the third ECU 13. Therefore, in step S14, the transmitter code and the receiver code match each other, and it is determined in step S15 that "authentication has succeeded". The fourth ECU 14 uses the communication information B to control the on-vehicle device.

Next, a case where a data frame including fraudulent data is transmitted from the third ECU 13 to the on-vehicle network, will be described. It is assumed that the fraudulent data is communication information A' generated by the communication information A transmitted from the second ECU 12 being falsified. In a case where the identifier is not changed by the third ECU 13, the data frame includes the first identifier, the communication information A', and the transmitter code generated by use of the second encryption key K2, similarly to the data frame 32 shown in FIG. 3. Since the first identifier is included in the data frame, the fourth ECU 14 that has received the data frame including the fraudulent data determines that the communication information to be used by the fourth ECU 14 for controlling the on-vehicle device is included in the data frame, and performs the reception-side process. The fourth ECU 14 determines "Yes" in step S11, and generates the receiver code by use of the first encryption key K1 in step S12. Since the transmitter code is generated by use of the second encryption key K2, the transmitter code and the receiver code do not match each other in step S14, and authentication of the data frame fails. Therefore, security for the fourth ECU 14 which is not connected to the network outside the vehicle can be improved.

On the other hand, in a case where the identifier is changed from the first identifier to the second identifier by the third ECU 13, the fourth ECU 14 generates the receiver code by use of the second encryption key K2. In this case, authentication of the data frame including the communication information A' (for example, falsified speed information) succeeds in the fourth ECU 14. However, since the identifier assigned to the data frame is the second identifier, the fourth ECU 14 attempts to use the communication information A' as the communication information B (for example, positional information). The communication information A' is based on the communication information A (speed information) having data contents which are entirely different from the communication information B. Therefore, the communication information A' is not used, by the fourth ECU 14, for control using the positional information. Therefore, security for the fourth ECU 14 which is not connected to the network outside the vehicle can be improved.

In a case where the identifier is changed from the first identifier to the second identifier, an identifier as well as the communication information may be used as a message used for generating a message authentication code such that authentication of the data frame including fraudulent data does not succeed in the fourth ECU 14. In a case where the data frame including the fraudulent data is transmitted from the third ECU 13 to the on-vehicle network, when the identifier is changed after the transmitter code has been generated, the data frame includes the second identifier, the communication information A', and a transmitter code generated from the communication information A' and the first identifier (identifier which has not been changed) by use of the second encryption key K2. The fourth ECU 14 that has received the data frame generates the receiver code from the communication information A' and the second identifier by use of the second encryption key K2. Therefore, authentication of the data frame including the fraudulent data does not succeed in the fourth ECU 14.

[Effects of Embodiment, and the Like]

In the present embodiment, when the transmitter code is verified, since the third ECU 13 does not have the first encryption key K1 used by the first ECU 11, even if the data frame including the fraudulent data is transmitted to the on-vehicle network 20 from the third ECU 13 having the interface for outside of the vehicle, authentication of the data frame including the fraudulent data does not succeed in the first ECU 11. Therefore, the process operation of the first ECU 11 can be prevented from being affected by cyber-attack.

Further, in the present embodiment, since the fourth ECU 14 selectively uses the encryption key according to the identifier assigned to the data frame, the transmitter code for the data frame from the second ECU 12, and the transmitter code for the data frame from the third ECU 13 can be each verified. Therefore, the message authentication is performed for each of the data frame from the second ECU 12 and the data frame from the third ECU 13, and the fourth ECU 14 is then allowed to use the communication information included in the data frame.

The on-vehicle communication system 10 includes a plurality of ECUs, other than the first ECU 11 and the second ECU 12, for controlling a vehicle running state. The ECU, among the plurality of ECUs, which does not use the communication information (hereinafter, referred to as "externally obtained information") obtained from an external device by the third ECU 13, has only the first encryption key K1 among the first encryption key K1 and the second encryption key K2. Therefore, similarly to the first ECU 11 and the second ECU 12, the process operation of the ECU can be prevented from being affected by cyber-attack. Further, the ECU, among the plurality of ECUs for controlling the vehicle running state, which uses the externally obtained information has the first encryption key K1 and the second encryption key K2, and performs the same reception-side process as the fourth ECU 14.

An ECU mounted to the vehicle afterward may have only the second encryption key K2 among the first encryption key K1 and the second encryption key K2. In this case, security level can be made different between the ECUs originally mounted to the vehicle and the ECU mounted to the vehicle afterward.

In the present embodiment, the first ECU 11 may be an ECU (hereinafter, referred to as "fail-safe ECU") that performs a fail-safe process. In this case, a process operation of the fail-safe ECU can be prevented from being affected by cyber-attack. For example, in the fail-safe process, a signal representing a vehicle state is used, and a subject operation is allowed only when a predetermined signal is received. In an exemplary case where the fail-safe ECU is an ECU for controlling a vehicle running state, the fail-safe ECU is, for example, an engine control ECU. In a case where an engine actuation signal is inputted from an external device via the third ECU 13, only when a vehicle speed signal indicating that a vehicle speed is zero, and a hood signal indicating that a hood of the vehicle is closed, are received, the engine control ECU actuates an engine. In this case, the message authentication for the vehicle speed signal and the hood signal is performed by use of the first encryption key, whereby cyber-attack via the third ECU 13 can be prevented. Further, in an exemplary case where the fail-safe ECU is not an ECU for controlling a vehicle running state, the fail-safe ECU may be, for example, a back door control ECU that allows an operation of electrically opening a back door to be performed only when receiving, from a meter ECU or the like, a parking brake signal indicating that a parking brake is ON. Further, the fourth ECU 14 may be a fail-safe ECU.

An ECU, among body ECUs other than the ECUs for controlling a vehicle running state, which does not use the externally obtained information may have only the first encryption key K1 among the first encryption key K1 and the second encryption key K2. Similarly to the first ECU 11, a process operation of the body ECU can be prevented from being affected by cyber-attack. The body ECU may have only the second encryption key K2 among the first encryption key K1 and the second encryption key K2. In this case, a security level is made different between the body ECUs and the ECUs for controlling the vehicle running state. In this case, in the message authentication of the data frame in communication between the body ECUs, each of the transmitter code and the receiver code is generated by use of the second encryption key K2.

[Specific Example of ECU]

The first ECU 11 is, for example, an engine control ECU. The first ECU 11 controls an engine based on the vehicle speed information or the like. The second ECU 12 is, for example, an ECU (for example, a brake ECU connected to a vehicle speed sensor) that serves as a transmitter of the vehicle speed information in the on-vehicle network 20. The second ECU 12 is also an ECU for controlling a vehicle running state. The second ECU 12 periodically transmits, to the on-vehicle network 20, the data frame including the most recent vehicle speed information (the communication information A). Further, the third ECU 13 obtains the most recent positional information (the communication information B) via the interface for outside of the vehicle, and periodically transmits, to the on-vehicle network 20, the data frame including the most recent positional information. The fourth ECU 14 is, for example, a driving support ECU for performing driving support for a driver of the vehicle by use of the externally obtained information. For example, the fourth ECU 14 uses the vehicle speed information transmitted from the second ECU 12 and the positional information of the vehicle transmitted from the third ECU 13 to perform driving support.

[Modification 1]

In modification 1, the fourth ECU 14 is an ECU for transmitting communication information to an external device via the third ECU 13. For example, the fourth ECU 14 has only the second encryption key K2 among the first encryption key K1 and the second encryption key K2. In a case where authentication of the data frame (that is, data frame including the communication information (hereinafter, referred to as "information for outside") transmitted from the third ECU 13 to an external device) transmitted from the fourth ECU 14 to the third ECU 13, is performed, a message authentication code is generated by using an accumulated travel distance of the vehicle. The fourth ECU 14 may have both the first encryption key K1 and the second encryption key K2.

In the on-vehicle communication system 10 having the third ECU 13 connected to the network outside the vehicle, in a case where the data frame including the information for outside is illicitly intercepted, copy data generated by the data frame being copied may be transmitted to the on-vehicle network 20. In this case, if only the communication information and the second encryption key K2 are used for generating message authentication code, authentication of the copy data may succeed in the third ECU 13, and the communication information included in the copy data may be transmitted to the external device. In a case where the copy data is transmitted to the on-vehicle network 20 after elapse of some time since a normal data frame has been transmitted, the information for outside which is different from the most recent information may be transmitted to the external device. For example, in a case where the information for outside is vehicle speed information, the vehicle speed information that is different from the most recent information may be transmitted to the external device.

In modification 1, the message authentication code is generated by use of an accumulated travel distance having a value varying according to traveling of the vehicle, for the data frame including the information for outside, such that authentication of the copy data does not succeed in the third ECU 13.

The fifth ECU 15 (meter ECU) is connected to the on-vehicle network 20. The fifth ECU 15 has an interface for inside of the vehicle, and has the second encryption key K2. The fifth ECU 15 calculates an accumulated travel distance of the vehicle by counting pulse signals outputted from a wheel speed sensor mounted in a wheel. The fifth ECU 15 displays the most recent accumulated travel distance on an odometer. Further, the fifth ECU 15 performs the transmission-side process when transmitting the accumulated travel distance to the on-vehicle network 20 at predetermined time intervals. The fifth ECU 15 generates the transmitter code by use of the second encryption key K2, and transmits, to the on-vehicle network 20, the data frame including the accumulated travel distance, an identifier associated with the accumulated travel distance, and the transmitter code.

Each of the third ECU 13 and the fourth ECU 14 receives the data frame including the accumulated travel distance, and determines that the communication information (accumulated travel distance) to be used by each of the third ECU and the fourth ECU, is included in the data frame, based on the identifier included in the data frame, to perform the reception-side process. Each of the third ECU 13 and the fourth ECU 14 generates the receiver code by use of the second encryption key K2. Therefore, authentication of the data frame succeeds. Each of the third ECU 13 and the fourth ECU 14 stores the accumulated travel distance after the authentication has succeeded. The accumulated travel distances stored in the third ECU 13 and the fourth ECU 14, respectively, have the same value.

The fourth ECU 14 performs the transmission-side process when transmitting the data frame including the information for outside (for example, vehicle speed information). The fourth ECU 14 uses, as a message, the most recent accumulated travel distance stored therein, and the information for outside to be stored in the data frame. The fourth ECU 14 generates the transmitter code from the most recent accumulated travel distance and the information for outside by use of the second encryption key K2. The fourth ECU 14 transmits, to the on-vehicle network 20, the data frame including the information for outside, an identifier associated with the information for outside, and the transmitter code.

The third ECU 13 determines, when receiving the data frame including the information for outside, that the information for outside which is to be used by the third ECU 13 for communication with the external device is included in the data frame, based on the identifier included in the data frame, to perform the reception-side process. The third ECU 13 sets the data frame including the information for outside, as the frame to be verified, to perform the reception-side process. The third ECU 13 uses, as a message, the most recent accumulated travel distance stored in the third ECU 13, and the information for outside which is included in the frame to be verified. The third ECU 13 generates the receiver code from the most recent accumulated travel distance and the information for outside by use of the second encryption key K2. The third ECU 13 compares the transmitter code included in the frame to be verified, with the receiver code generated by the third ECU 13. Since the transmitter code and the receiver code are both generated by use of the most recent accumulated travel distance and the second encryption key K2, the transmitter code and the receiver code match each other. Authentication of the frame to be verified succeeds. The third ECU 13 transmits the information for outside to the external device according to a communication protocol between the external device and the third ECU 13.

In modification 1, when the accumulated travel distance is increased, the message authentication code (the transmitter code and the receiver code) that is newly generated is not the same as the message authentication code that has been previously generated. Therefore, authentication of the copy data can be prevented from succeeding in the third ECU 13, and transmission of the communication information different from the most recent information to the external device can be prevented.

While the vehicle is at a stop, the accumulated travel distance does not change. Therefore, the message authentication code that is newly generated may be the same as the message authentication code which has been previously generated while the vehicle is at a stop, in some cases. Therefore, when the message authentication code is generated, the number of times an ignition switch of the vehicle is operated (the total of the number of ON operations and the number of OFF operations) may be further used as the message. That is, the message authentication code may be generated from the most recent accumulated travel distance, the number of times the ignition switch is operated, and information for outside by use of the second encryption key K2. Instead of the number of times the ignition switch is operated, the number of times the ignition switch becomes ON, or the number of times the ignition switch becomes OFF may be used as the message. The number of times the ignition switch is operated, the number of times the ignition switch becomes ON, or the number of times the ignition switch becomes OFF is, for example, the accumulated number of times that is calculated from a point of time when a user that has purchased the vehicle starts the use of the vehicle. The number of times the ignition switch is operated, the number of times the ignition switch becomes ON, or the number of times the ignition switch becomes OFF is counted by, for example, an ECU connected to the ignition switch, and the counted value is transmitted to the on-vehicle network 20 each time the value is counted. Thus, the fourth ECU 14 and the third ECU 13 can share the counted value. Further, a procedure in which the counted values are previously adjusted so as to be the same is unnecessary, unlike in a case where each ECU has a counter. As a method for generating the message authentication code, for example, a method in which the message authentication code is generated by the message being multiplied by the encryption key, or a method in which a plurality of pieces of data (messages) connected with each other are converted according to a hash function, may be used.

[Modification 2]

Figure 6:
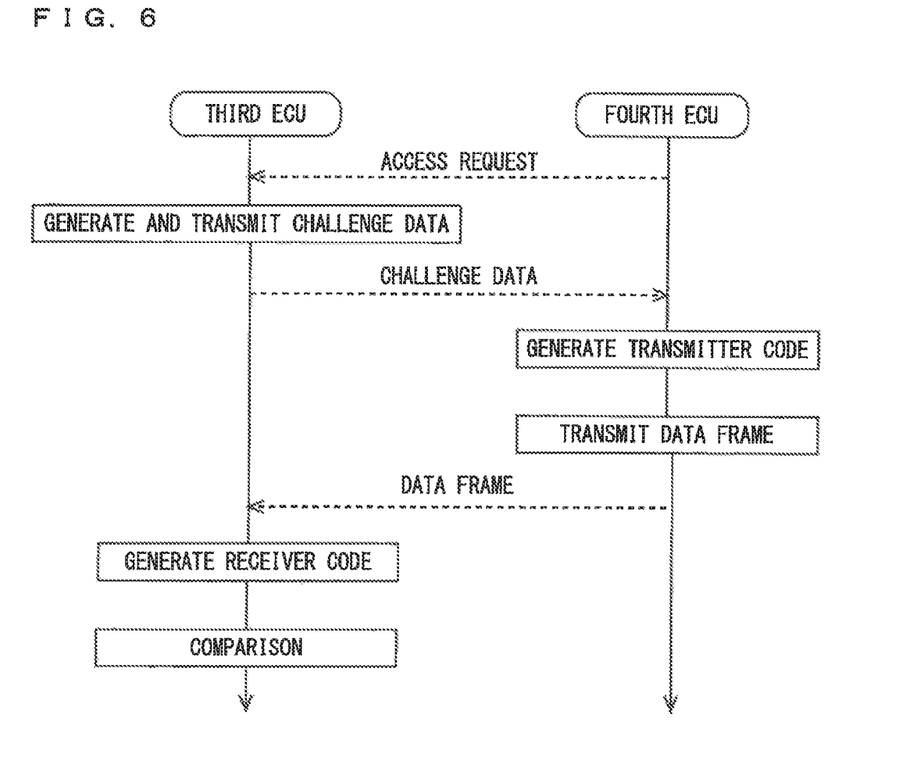
FIG. 6 shows a flow of message authentication according to modification 2.

In modification 2, similarly to modification 1, the fourth ECU 14 is an ECU for transmitting the communication information via the third ECU 13 to an external device. For example, the fourth ECU 14 has only the second encryption key K2 among the first encryption key K1 and the second encryption key K2. In a case where authentication of the data frame to be transmitted from the fourth ECU 14 to the third ECU 13, is performed, the message authentication code is generated by use of challenge data in a challenge and response method, unlike in modification 1. The fourth ECU 14 may have both the first encryption key K1 and the second encryption key K2. FIG. 6 shows a flow of message authentication according to modification 2.

The fourth ECU 14 sends an access request to the third ECU 13 when transmitting, to the third ECU 13, the data frame including the information for outside (for example, vehicle speed information). The third ECU 13 that has received the access request, generates, as the challenge data, a random number of a predetermined number of bits. The third ECU 13 stores the challenge data in its own memory, and transmits the challenge data to the fourth ECU 14.

The fourth ECU 14 performs the transmission-side process when receiving the challenge data from the third ECU 13. The fourth ECU 14 uses, as the message, the received challenge data, and the information for outside to be stored in the data frame. The fourth ECU 14 generates the transmitter code from the challenge data and information for outside by use of the second encryption key K2. The fourth ECU 14 transmits, to the on-vehicle network 20, the data frame including the information for outside, an identifier associated with the information for outside, and the transmitter code. In the communication for the challenge data, the second encryption key K2 is used for generating each of the transmitter code and the receiver code.

The third ECU 13 determines, when receiving the data frame including the information for outside, that the information for outside which is to be used by the third ECU 13 for communication with the external device is included in the data frame, based on the identifier included in the data frame, to perform the reception-side process. The third ECU 13 sets the data frame including the information for outside as the frame to be verified, to perform the reception-side process. The third ECU 13 uses, as the message, the challenge data stored in the third ECU 13, and the information for outside which is included in the frame to be verified. The third ECU 13 generates the receiver code from the challenge data and the information for outside by use of the second encryption key K2. The third ECU 13 compares the transmitter code included in the frame to be verified, with the receiver code generated by the third ECU 13. Since the transmitter code and the receiver code are both generated by use of the challenge data and the second encryption key K2, the transmitter code and the receiver code match each other. Authentication of the frame to be verified succeeds. The third ECU 13 transmits the information for outside to the external device according to a communication protocol between the external device and the third ECU 13.

In modification 2, since the message authentication code is generated by use of a random number (challenge data) in addition to the encryption key, each time the message authentication code is generated, the code is different. Therefore, similarly to modification 1, authentication of the copy data can be prevented from succeeding in the third ECU 13, and transmission, of the communication information which is different from the most recent information, to the external device can be prevented.

[Modification 3]

Figure 7:
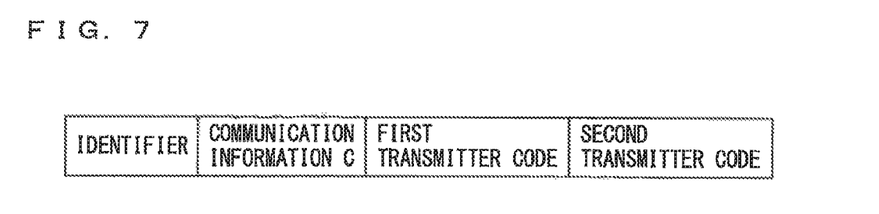
FIG. 7 shows a data frame to be transmitted by the fourth ECU in an on-vehicle communication system according to modification 3.

In modification 3, the fourth ECU 14 is an ECU for transmitting the data frame including communication information C to be used by each of the first ECU 11 and the third ECU 13. The fourth ECU 14 has the first encryption key K1 and the second encryption key K2. The fourth ECU 14 assigns, to the data frame including the communication information C, a first transmitter code generated by use of the first encryption key K1 and a second transmitter code generated by use of the second encryption key K2.

The fourth ECU 14 performs the transmission-side process when transmitting the data frame including the communication information C. The fourth ECU 14 generates the first transmitter code from the communication information C by use of the first encryption key K1, and generates the second transmitter code from the communication information C by use of the second encryption key K2. As shown in FIG. 7, the fourth ECU 14 transmits, to the on-vehicle network 20, the data frame including an identifier associated with the communication information C, the communication information C, the first transmitter code, and the second transmitter code.

Further, the first ECU 11 determines, when receiving the data frame including the communication information C, that the communication information to be used by the first ECU 11 is included in the data frame, based on the identifier included in the data frame, to perform the reception-side process. The first ECU 11 sets the data frame including the communication information C as the frame to be verified, to perform the reception-side process. The first ECU 11 generates the receiver code from the communication information C included in the frame to be verified by use of the first encryption key K1. When one of the first transmitter code and the second transmitter code included in the frame to be verified matches the receiver code generated by the first ECU 11, the first ECU 11 determines that authentication of the frame to be verified has succeeded. Since the receiver code is generated by use of the first encryption key K1, the receiver code matches the first transmitter code. Therefore authentication of the frame to be verified succeeds.

The third ECU 13 determines, when receiving the data frame including the communication information C, that the communication information C to be used for communication with the external device by the third ECU 13 is included in the data frame, based on the identifier included in the data frame, to perform the reception-side process. The third ECU 13 sets the data frame including the communication information C as the frame to be verified, to perform the reception-side process. The third ECU 13 generates the receiver code from the communication information C included in the frame to be verified, by use of the second encryption key K2. When one of the first transmitter code and the second transmitter code included in the frame to be verified matches the receiver code generated by the third ECU 13, the third ECU 13 determines that authentication of the frame to be verified has succeeded. Since the receiver code is generated by use of the second encryption key K2, the receiver code matches the second transmitter code. Therefore, authentication of the frame to be verified succeeds, and the third ECU 13 transmits the communication information C to the external device, according to a communication protocol between the external device and the third ECU 13.

According to modification 3, both the first ECU 11 having only the first encryption key K1 and the third ECU 13 having only the second encryption key K2 are allowed to verify the transmitter code assigned to the data frame including the communication information C. Transmission of communication data used by two ECUs, that is, the first ECU 11 and the third ECU 13, can be performed at one time.

[Modification 4]

In the above embodiments, each of the ECUs 11 to 15 uses only the communication information as the message used for generating the message authentication code (the transmitter code and the receiver code). However, in modification 4, data (for example, the most recent travel distance information or the challenge data) having a value varying each time the message authentication code is generated may be used as the message used for generating the message authentication code. In this case, the on-vehicle communication system 10 is configured such that the ECUs 11 to 15 can share data having the same value. As the message used for generating the message authentication code, the number of times an ignition switch of the vehicle is operated (total of the number of ON operations and the number of OFF operations), the number of times the ignition switch becomes ON, or the number of times the ignition switch becomes OFF may be further used.

The present invention is applicable to, for example, an on-vehicle communication system that performs message authentication.

What is claimed is:

1. An Electric Control Unit (ECU) device connected to an on-vehicle network and a network outside a vehicle, the ECU comprising:
    a network communication interface configured to communicate via the network outside of the vehicle;
    one or more processors; and
    a memory coupled with and readable by the one or more processors, wherein
        the memory stores a first encryption key, and
        the one or more processors are configured to:
            upon receipt of communication information from the network outside of the vehicle via the network communication interface:
                generate a transmitter code from the received communication information by using the first encryption key, the first encryption key being different from a second encryption key that is shared among other on-vehicle ECUs communicable with the ECU device via the on-vehicle network, and
                transmit, to the on-vehicle network, a message data frame that includes an identifier associated with the received communication information, the received communication information, and the generated transmitter code, wherein at least one of the other on-vehicle ECUs successfully authenticates the message data frame containing the communication information by using the first encryption key to generate a receiver code, and matching the received code with the transmitter code, upon receipt of the message data frame, and successfully authenticates other message data frames generated by the other on-vehicle ECUs by use of the second encryption key to generate the transmitter code used for the matching, upon receipt of the other message data frames.

2. The ECU device according to claim 1, wherein the one or more processors are configured to: generate the transmitter code from the received communication information by using the first encryption key and a monotonically increasing value.

3. The ECU device according to claim 2, wherein the monotonically increasing value is a most recent accumulated travel distance.

4. The ECU device according to claim 1, wherein the ECU device is not configured to generate a receiver code for verifying message data frames.

5. The ECU device according to claim 4, wherein the ECU device is configured to receive the communication information from a multimedia external terminal that performs verification of the communication information before transmitting the communication information to the ECU device.

6. The ECU device according to claim 5, wherein
    the ECU device is configured to cause connection between the external multimedia terminal and the other on-vehicle ECUs, and
    the ECU device merely passes data communicated between the external multimedia terminal and the other on-vehicle ECUs.

7. A vehicle including an Electric Control Unit (ECU) device connected to an on-vehicle network and a network outside the vehicle, the ECU device comprising:
    a network communication interface configured to communicate via the network outside of the vehicle;
    one or more processors; and
    a memory coupled with and readable by the one or more processors, wherein
        the memory stores a first encryption key, and
        the one or more processors are configured to:
            upon receipt of communication information from the network outside of the vehicle via the network communication interface:
                generate a transmitter code from the received communication information by using the first encryption key, the first encryption key being different from a second encryption key that is shared among other on-vehicle ECUs communicable with the ECU device via the on-vehicle network, and
                transmit, to the on-vehicle network, a message data frame that includes an identifier associated with the received communication information, the received communication information, and the generated transmitter code, wherein at least one of the other on-vehicle ECUs successfully authenticates the message data frame containing the communication information by using the first encryption key to generate a receiver code, and matching the received code with the transmitter code, upon receipt of the message data frame, and successfully authenticates other message data frames generated by the other on-vehicle ECUs by use of the second encryption key to generate the transmitter code used for the matching, upon receipt of the other message data frames.

8. The vehicle according to claim 7, wherein the one or more processors are configured to: generate the transmitter code from the received communication information by using the first encryption key.

9. The vehicle according to claim 8, wherein the monotonically increasing value is a most recent accumulated travel distance.

10. The vehicle according to claim 7, wherein the ECU device is not configured to generate a receiver code for verifying message data frames.

11. The vehicle according to claim 10, wherein the ECU device is configured to receive the communication information from an external multimedia terminal that performs verification of the communication information before transmitting the communication information to the ECU device.

12. The vehicle according to claim 11, wherein
    the ECU device is configured to cause connection between the external multimedia terminal and the other on-vehicle ECUs, and
    the ECU device merely passes data communicated between the external multimedia terminal and the other on-vehicle ECUs.

13. A method executed by an Electric Control Unit (ECU) device connected to an on-vehicle network and a network outside a vehicle, the method comprising:

upon receipt of communication information from the network outside of the vehicle via a network communication interface of an outside network-enabled ECU:

generating, by the outside network-enabled ECU, a transmitter code from the received communication information by using a first encryption key stored in a memory of the outside network-enabled ECU, the first encryption key being different from a second encryption key that is shared among other on-vehicle ECUs communicable with the ECU device via the on-vehicle network, and transmitting, by the outside network-enabled ECU to the on-vehicle network, a message data frame that includes an identifier associated with the received communication information, the received communication information, and the generated transmitter code, wherein at least one of the other on-vehicle ECUs successfully authenticates the message data frame containing the communication information by using the first encryption key to generate a receiver code, and matching the received code with the transmitter code, upon receipt of the message data frame, and successfully authenticates other message data frames generated by the other on-vehicle ECUs by use of the second encryption key to generate the transmitter code used for the matching, upon receipt of the other message data frames.

14. The method according to claim 13, wherein the generating of the transmitter code includes generating the transmitter code using the first encryption key and a monotonically increasing value.

15. The method according to claim 14, wherein the monotonically increasing value is a most recent accumulated travel distance.

16. The method according to claim 13, wherein the outside network-enabled ECU is not configured to generate a receiver code for verifying message data frames.

17. The method according to claim 16, wherein the outside network-enabled ECU is configured to receive the communication information from an external multimedia terminal that performs verification of the communication information before transmitting the communication information to the ECU device.

18. The method according to claim 17, wherein
the outside network-enabled ECU is configured to cause connection between the external multimedia terminal and the other on-vehicle ECUs, and
the outside network-enabled ECU merely passes data communicated between the external multimedia terminal and the other on-vehicle ECUs.

* * * * *